(12) United States Patent
Plascencia et al.

(10) Patent No.: US 10,132,349 B2
(45) Date of Patent: Nov. 20, 2018

(54) ROLLING BEARING DEVICE FOR TELESCOPIC MASTS AND FORK CARRIAGE FOR FORK LIFT TRUCKS

(71) Applicant: METER S.p.A., Robassomero (TO) (IT)

(72) Inventors: Xane Plascencia, Robassomero (IT); Simone Oddovero, Robassomero (IT); Damaso Damasio, Robassomero (IT)

(73) Assignee: METER S.p.A., Robassomero (TO) (IT)

( * ) Notice: Subject to any disclaimer, the term of this patent is extended or adjusted under 35 U.S.C. 154(b) by 0 days.

(21) Appl. No.: 15/825,503

(22) Filed: Nov. 29, 2017

(65) Prior Publication Data

US 2018/0156271 A1    Jun. 7, 2018

(30) Foreign Application Priority Data

Dec. 2, 2016   (IT) .................................. 10160122471

(51) Int. Cl.

| F16C 25/06 | (2006.01) |
|---|---|
| F16C 35/06 | (2006.01) |
| F16C 13/00 | (2006.01) |
| B66F 9/08 | (2006.01) |
| F16C 35/063 | (2006.01) |
| F16C 23/06 | (2006.01) |
| F16C 33/58 | (2006.01) |

(52) U.S. Cl.
CPC ................ *F16C 25/06* (2013.01); *B66F 9/08* (2013.01); *F16C 13/006* (2013.01); *F16C 23/06* (2013.01); *F16C 33/586* (2013.01); *F16C 35/0635* (2013.01)

(58) Field of Classification Search
CPC ........ F16C 23/06; F16C 25/06; F16C 13/006; F16C 35/0635; F16C 35/063; B66F 9/08
See application file for complete search history.

(56) References Cited

U.S. PATENT DOCUMENTS 1,165,537 A * 12/1915 Parkes .................... F16C 23/06
                                                            384/519
1,366,089 A *  1/1921 Wenzel ................... F16C 27/04
                                                            384/535

(Continued)

FOREIGN PATENT DOCUMENTS

| DE | 102004042335 A1 | 3/2006 |
| JP | H01103694 U | 7/1989 |
| WO | 2006024522 A1 | 3/2006 |

OTHER PUBLICATIONS

Search Report dated Jul. 18, 2017, for Italian Application No. 102016000122471, 7 pages.

*Primary Examiner* — Alan B Waits
(74) *Attorney, Agent, or Firm* — RMCK Law Group PLC

(57) ABSTRACT

A device for adjusting a rolling bearing for mutual sliding of mast members for supporting a fork carriage of a fork lift truck includes a threaded coupling between an inner ring of the rolling bearing and a relative support pin, and an actuation member freely rotatable through the support pin and rotatably connected with the inner ring. The actuation member can be maneuvered to rotate the inner ring and vary the axial position of the rolling bearing with respect to the support pin through the threaded coupling.

3 Claims, 3 Drawing Sheets

(56) References Cited

U.S. PATENT DOCUMENTS

| | | | | |
|---|---|---|---|---|
| 2,388,503 A | * | 11/1945 | Steinle | F16C 23/06 384/247 |
| 3,782,502 A | * | 1/1974 | Kobayashi | B66F 9/08 187/226 |
| 4,035,040 A | * | 7/1977 | Yarris | B60B 35/02 301/5.7 |
| 4,234,057 A | * | 11/1980 | Nakane | B66F 9/08 187/238 |
| 4,375,247 A | * | 3/1983 | McNeely | B66F 9/08 187/238 |
| 4,914,712 A | * | 4/1990 | Ikimi | B66F 9/08 384/449 |
| 5,302,030 A | * | 4/1994 | Buie | A47B 88/437 312/334.19 |

* cited by examiner

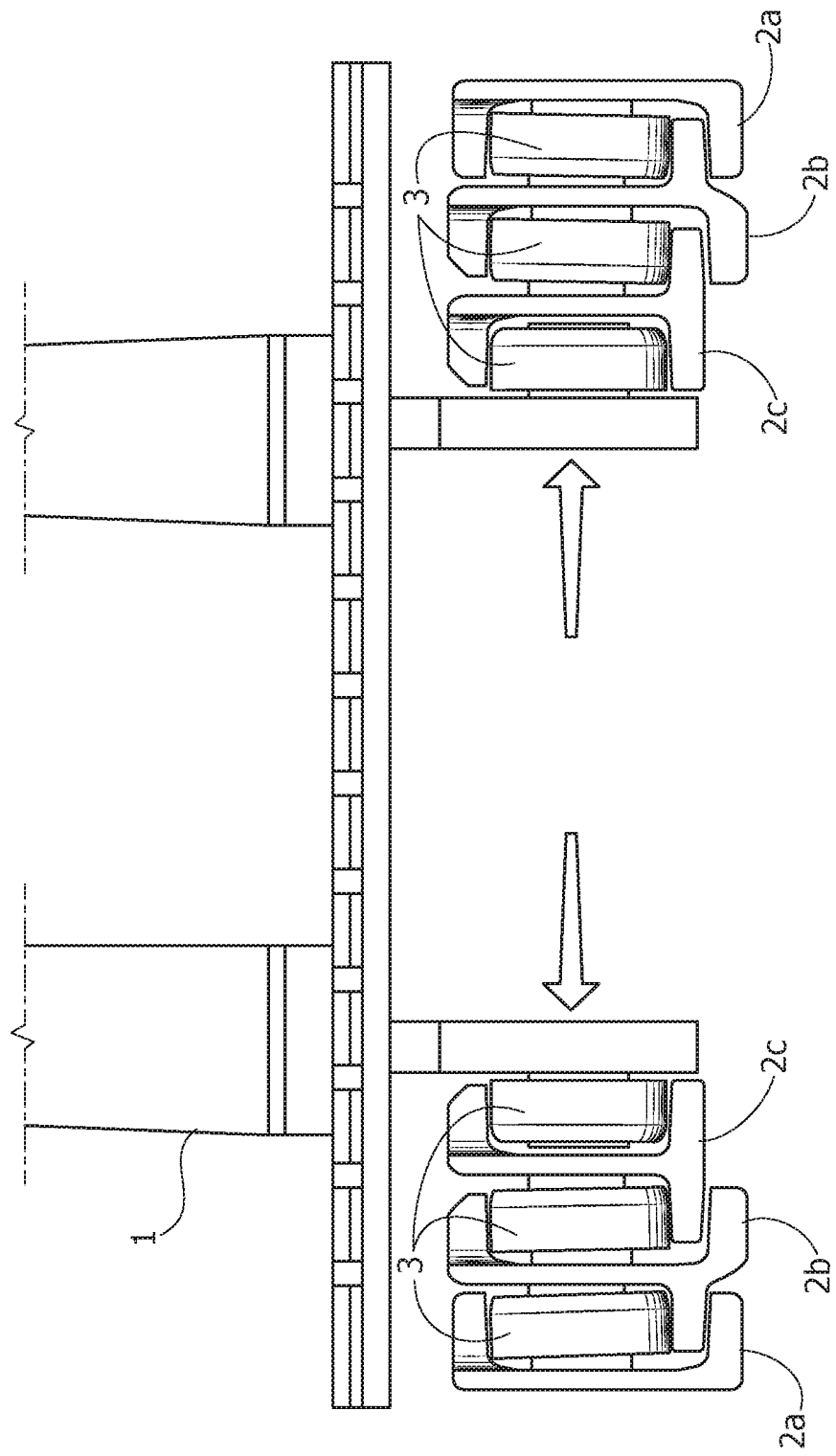

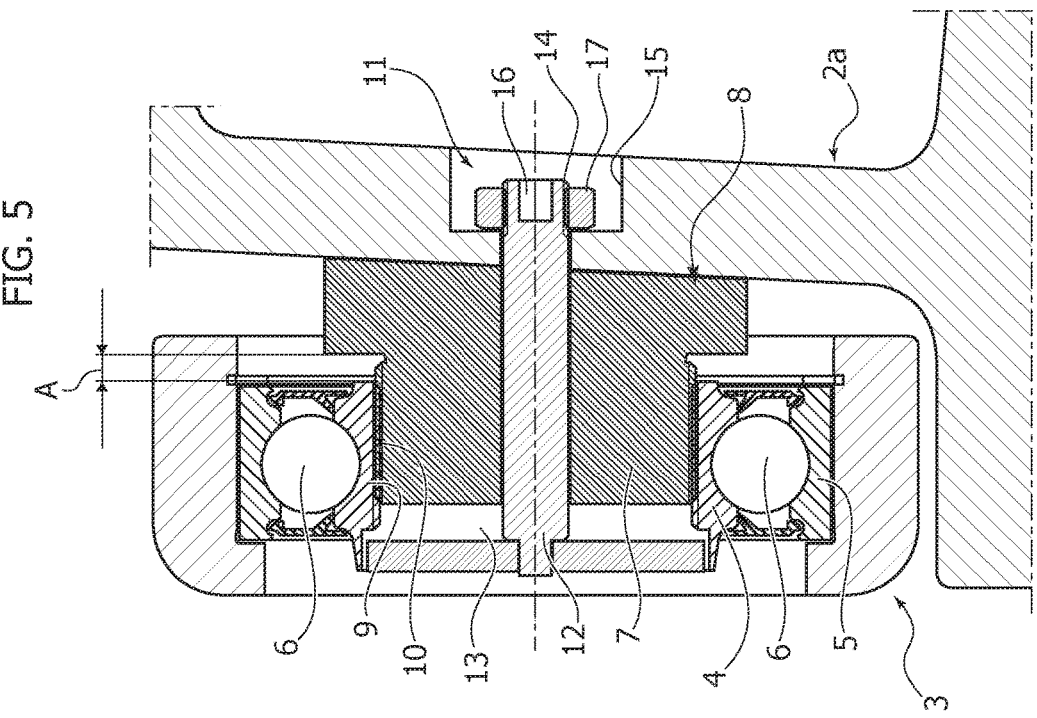
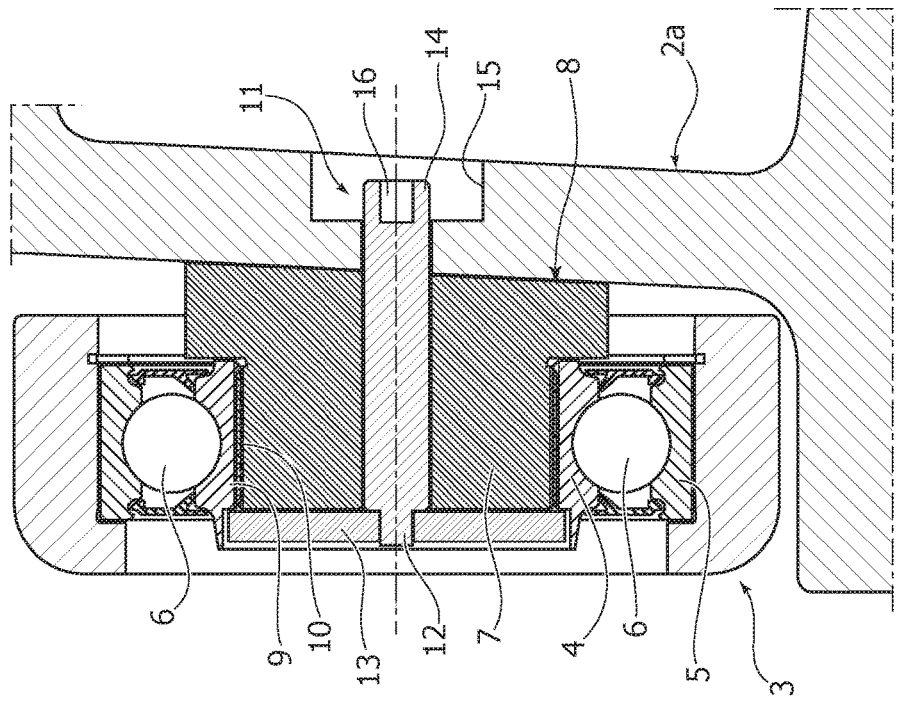

ROLLING BEARING DEVICE FOR TELESCOPIC MASTS AND FORK CARRIAGE FOR FORK LIFT TRUCKS

CROSS REFERENCE TO RELATED APPLICATIONS

This application claims priority to Italian Patent Application No. 102016000122471 filed on Dec. 2, 2016, the entire disclosure of which is incorporated herein by reference.

FIELD OF THE INVENTION

The present invention generally refers to fork lift trucks provided with telescopic masts along which the forks are vertically mobile.

These telescopic masts typically include three pairs of mast members each of which defines a guide track for a rolling bearing borne by a contiguous mast.

When manufacturing the fork lift truck, the rolling bearings are pre-assembled to the relative mast members, applying them on respective support pins. In the typical case in which each mast comprises an outer mast member, an intermediate mast member and an inner mast member, the first will be provided with a rolling bearing at the upper end thereof, the second with a pair of rolling bearings at both the upper and lower end, and the third with a rolling bearing at the lower end thereof. After pre-assembling the bearings, the three mast members of each telescopic mast are coupled to each other and then there follows the verification of the distance or the mutual gap measured along the axis of the bearings. After the measurement there follows, if necessary, the adjustment of the axial position of the rolling bearings conventionally using shim washers positioned between the inner ring of the rolling bearing and an axial contrast annular surface of the relative support pin. This operation, possibly repeated for all bearings of both telescopic masts, is tedious and complex in that it requires the disassembly of the mast members, the removal of the rolling bearings from the relative support pins, the insertion of the shim washers, and then fixing the bearings once again. After reassembling the two telescopic masts there follows a new verification of the sliding gaps and possible subsequent adjustments with addition or removal of shim washers.

Similar problems arise as regards the bearings that the fork carriage is usually provided with: once the mast members are adjusted using the shim washers and assembled, there follows the measurement of the distance between the pair of the innermost masts, in various positions, and the smaller measured distance is taken into account. Then there follows the adjustment of the bearings of the fork carriage using shim washers, by inserting and removing the fork carriage even several times with respect to the masts until it can move correctly: free but without excessive clearance. These operations are clearly long and complex.

STATE OF THE PRIOR ART

In order to avoid these tedious assembling, disassembling and reassembling operations, the U.S. Pat. No. 4,914,712 proposed providing each rolling bearing with a device for adjusting the axial position thereof without requiring the use of shim washers. This device consists in a screw that traverses the mast member and it is screwed in a threaded axial hole of the support pin of the relative rolling bearing. The screw has an end head connected, in a rotatable but axially blocked fashion, to the inner ring of the rolling bearing. Screwing or respectively unscrewing the screw with respect to the support pin, the inner ring and thus the rolling bearing as a whole translate axially towards the desired adjustment position.

Though appropriate for solving the aforementioned problems, this known solution reveals to be inappropriate from a structural point of view given that the axial loads, to which the rolling bearing is subjected during the operation of the fork lift truck, are transmitted from the inner ring thereof to the adjustment screw which, alongside the end head thereof coupled to the inner ring of the bearing, is thus subjected to considerable strains, even flexural. These strains can generate fatigue stresses as well as the breakage of the adjustment screw, with the obvious drawbacks that may arise therefrom.

The Japanese utility model JP H01 103694 also describes a device for adjusting a rolling bearing which reveals the same drawbacks outlined above.

SUMMARY OF THE INVENTION

The object of the present invention is to overcome the aforementioned technical problems, and this object is attained due to a rolling bearing device of the type defined above, whose distinctive feature as outlined in claim 1 lies in the fact that the adjustment device comprises a threaded coupling between an inner threading provided on the inner ring of the rolling bearing and an outer threading provided on the support pin, and an actuation member axially extending—in a freely rotatable fashion—through the support pin and it is rotatably connected with the inner ring of the rolling bearing, said actuation member being manoeuvrable to rotate said inner ring and vary the axial position of the rolling bearing with respect to said support pin through the aforementioned threaded coupling.

Thanks to this solution idea, the axial adjustment of the rolling bearing can be easily carried out thus avoiding the disassembly thereof and the use of shim washers, and without the actuation member being subjected to axial loads and the ensuing stresses. As a matter of fact, the presence of the threaded coupling between the inner ring of the rolling bearing and the relative support pin enables the loads being used to be discharged on the threading and thus directly transferred to the mast member. Thus, the actuation member solely constitutes a structurally "weak" element, whose task is no longer to support the axial loads but simply to control the rotation of the inner ring of the bearing during the adjustment, and thus rotatably blocking by rotatably holding the bearing in its axial position thus adjusted.

According to a preferred embodiment of the invention, the actuation member is provided at one end thereof with a transverse element rotatably coupled with said inner ring of the roller bearing and whose opposite end traverses the mast member and it is housed within an outer recess thereof. Such opposite end of the actuation member is provided with a seat for the introduction of a maneuvering tool and an outer threading for the engagement of a blocking nut.

BRIEF DESCRIPTION OF THE DRAWINGS

The invention will now be described in detail, purely by way of non-limiting example, with reference to the attached drawings, wherein:

FIG. 3 is a transversal section and larger detail view according to line III-III of FIG. 1, FIG. 4 shows—in larger detail and axial cross-section—one of the rolling bearings of the masts unit, equipped with the device according to the invention represented in a first adjustment position, and FIG. 5 is a view analogous to FIG. 4 with the device in a second adjustment position.

DETAILED DESCRIPTION OF THE INVENTION

Figure 1:
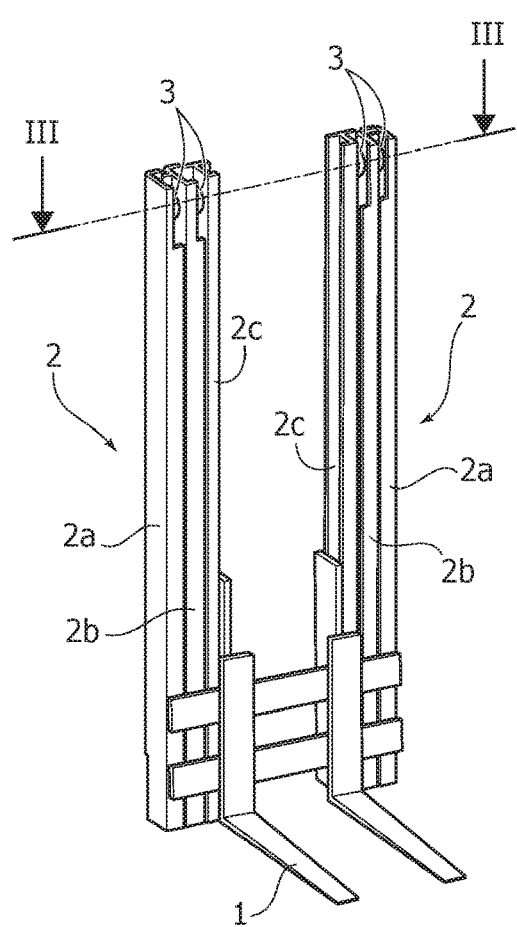
FIG. 1 is a schematic perspective view showing the telescopic masts unit of a fork lift truck, represented in a minimum height contracted condition.
Figure 2:
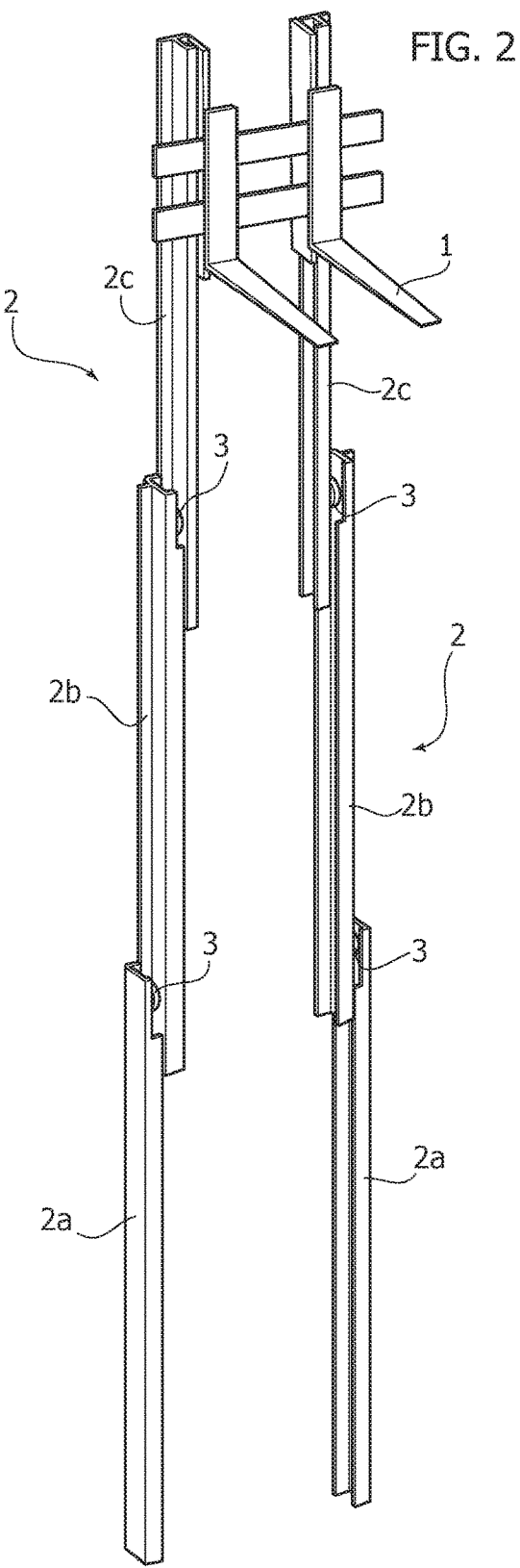
FIG. 2 is a view analogous to FIG. 1 representing the masts unit in the fully raised extended configuration.

FIGS. 1 and 2 schematically illustrate the system for moving the fork carriage 1 of a fork lift truck, conventionally comprising two vertical telescopic masts units 2 each of which comprises, in the case of the illustrated example, three mast members respectively outer 2a, intermediate 2b and inner 2c. Each mast member 2a, 2b, 2c is generally channel-shaped so as to enable the vertical sliding of the contiguous mast member between the fully lowered configuration of FIG. 1 and the fully raised configuration of FIG. 2 of the mast units 2. The sliding occurs with the help of rolling bearings indicated with 3: specifically, each outer mast member 2a is provided with a rolling bearing 3 at whose upper end each intermediate mast member 2b is provided with a pair of rolling bearings 3 respectively arranged at the lower end thereof and at the upper end thereof, and each inner mast member 2c is provided with a rolling bearing 3 at the lower end thereof.

Each bearing 3 is pre-assembled with the relative mast member before forming the mast units 2, as represented in detail in FIGS. 4 and 5 which simplify the application of a rolling bearing 3 to one of the outer mast members 2a. It should be observed that the description below can be identically applied to each of the rolling bearings 3 applied to each mast unit 2.

The rolling bearing 3 conventionally comprises a radially inner track or ring 4 and a radially outer track or ring 5 between which rolling members for example made up of a crown of balls 6 are interposed. The inner ring 4 is mounted on a small diameter portion 7 of a support pin 8 rigidly fixed to the mast member 2a and projecting thereinto. The radially outer ring 5 is designated to obtain the rolling contact with the corresponding contiguous mast member, constituted—in the case of the illustrated example—by the intermediate mast member 2b (not shown for illustration simplification purposes).

According to the distinctive characteristic of the invention, the radially inner ring 4 of the rolling bearing 3 has a threaded surface 9 at contact with a threaded outer surface 10 of the portion 7 of the support pin 8, so as to obtain a threaded coupling between such support pin 8 and the rolling bearing 3 through which the axial position of the latter can be easily and efficiently adjusted without requiring shim washers and thus avoiding the disassembling and reassembling of the rolling bearing 3 when assembling the mast units 2.

The screwing and unscrewing of the inner ring 4 with respect to the threaded portion 7 of the support pin 8, and thus the axial adjustment of the rolling bearing 3, is obtained according to the invention through an adjustment key 11 constituted by a stem which coaxially traverses—in a freely rotatable fashion—the mast member 2a and the support pin 8 and it is provided—at the distal end thereof, projecting beyond the threaded portion 7—with a tang 12 rotatably coupled with a transversal or radial arm 13 in turn rotatably coupled with the inner ring 4 of the rolling bearing 3. The opposite proximal end of the adjustment key 11, indicated with 14, is housed in an outer recess 15 of the mast member 2a and it has an axial seat 16 for the insertion of a maneuvering key. Such proximal end 14 is also externally threaded to receive, following operations for adjusting the rolling bearing 3, a blocking nut 17 represented in FIG. 5 through which the adjustment key 11 prevents the rotation of the radial arm 13 and thus of the inner ring 4.

In light of the description above, it is clear that the axial adjustment of the rolling bearing 3, for example between the two positions respectively represented in FIG. 4 and in FIG. 5 for the travel indicated with A in the latter, is obtained by simply turning the adjustment key 11 using the maneuvering tool inserted in the seat 16 thereof so as to screw or respectively unscrew—using the radial arm 13—the inner ring 4 with respect to the support pin 8. The threaded coupling 9-10 between the inner ring 4 of the rolling bearing 3 and the support pin 8 of each rolling bearing 3 enables the axial load applied thereto—during the extensions and contractions of the mast units 2—to be directly transferred to the respective mast member 2a or 2b or 2, respectively, without affecting the relative adjustment key 11 which is thus exempted from any structural function, in particular as regards the axial loads transmitted from the mast member to the outer ring 5 of the rolling bearing 3.

Obviously, the construction details and the embodiments may widely vary with respect to what has been described and illustrated, without departing from the scope of protection of the present invention as defined in the claims that follow. Thus, the invention identically and equally advantageously applies to the rolling bearings that the fork carriage 1 of the fork lift truck is usually provided with, inserted in the masts 2c.

What is claimed is:

1. A rolling bearing device for a mutual sliding guide of mast members which are part of telescopic masts for supporting a fork of a fork lift truck, said device comprising:
    a support pin rigidly connected to a first mast member,
    a rolling bearing comprising an inner ring, an outer ring and a plurality of rolling members interposed between the inner ring and the outer ring, wherein said inner ring is borne by said support pin and said outer ring is designed to roll relative to a contiguous second mast member, and
    a device for adjusting an axial position of said roller bearing relative to said support pin,
    wherein said adjustment device comprises:
        a threaded coupling between an inner threading provided on said inner ring of the roller bearing and an outer threading provided on said support pin,
        an actuation member axially extending in a freely rotatable fashion through said support pin and connected in rotation with the inner ring of the roller bearing, said actuation member being maneuverable to rotate said inner ring and vary the axial position of the roller bearing relative to said support pin by means of the said threaded coupling.

2. The device according to claim 1, wherein said actuation member includes, at one end thereof, a transverse element coupled in rotation with said inner ring of the roller bearing, and wherein an opposite end of the actuation member traverses the first mast member and is housed within an outer recess of the first mast member.

3. The device according to claim 2, wherein said opposite end of the actuation member is provided with a seat for introduction of a maneuvering tool and an outer threading for engagement of a blocking nut.

* * * * *